United States Patent
Palaschenko

(10) Patent No.: US 6,631,772 B2
(45) Date of Patent: *Oct. 14, 2003

(54) ROLLER BIT REARING WEAR DETECTION SYSTEM AND METHOD

(75) Inventor: Yuri A. Palaschenko, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/934,436

(22) Filed: Aug. 21, 2001

(65) Prior Publication Data

US 2002/0092680 A1 Jul. 18, 2002

Related U.S. Application Data

(60) Provisional application No. 60/226,764, filed on Aug. 21, 2000.

(51) Int. Cl.⁷ ................................................. F21B 12/02
(52) U.S. Cl. ........................................................ 175/39
(58) Field of Search ........................... 175/39, 339, 371, 175/331, 327

(56) References Cited

U.S. PATENT DOCUMENTS

| | | | |
|---|---|---|---|
| 2,560,328 A | 7/1951 | Bielstein | |
| 2,582,312 A | 1/1952 | Del' Homme | |
| 3,011,566 A | * 12/1961 | Graham | 175/39 |
| 3,058,532 A | 10/1962 | Alder | |
| 3,062,302 A | 11/1962 | Toth et al. | |
| 3,363,702 A | * 1/1968 | Bielstein | 175/39 |
| 3,578,092 A | 5/1971 | Tesch | |
| 3,581,564 A | 6/1971 | Young, Jr. | |
| 3,678,883 A | * 7/1972 | Fischer | 116/208 |
| 3,703,096 A | 11/1972 | Vitter, Jr. et al. | |
| 3,714,822 A | 2/1973 | Lutz | |
| 3,728,919 A | 4/1973 | Scott | |
| 3,774,445 A | 11/1973 | Rundell et al. | |
| 3,782,190 A | 1/1974 | Pittman | |
| 3,818,227 A | 6/1974 | Fries | |
| 3,853,087 A | 12/1974 | Aldag | |
| 3,853,184 A | * 12/1974 | McCullough | 175/39 |
| 3,865,736 A | 2/1975 | Fries | |
| 3,906,434 A | 9/1975 | Lemel et al. | |
| 3,913,686 A | 10/1975 | Manson, Jr. | |
| 4,001,773 A | 1/1977 | Lamel et al. | |
| 4,030,558 A | 6/1977 | Morris | |
| 4,040,003 A | 8/1977 | Beynet et al. | |
| 4,063,786 A | 12/1977 | Rall | |
| 4,074,575 A | 2/1978 | Bergman et al. | |
| 4,114,704 A | 9/1978 | Maurer et al. | |
| 4,148,271 A | 4/1979 | Majernik | |
| 4,150,568 A | 4/1979 | Berger et al. | |
| 4,346,591 A | 8/1982 | Evans | |
| 4,379,291 A | 4/1983 | Hubbard et al. | |

(List continued on next page.)

FOREIGN PATENT DOCUMENTS

| | | |
|---|---|---|
| GB | 2 363 146 A | 12/2001 |
| GB | 0 365 899 A | 2/2002 |

Primary Examiner—David Bagnell
Assistant Examiner—Daniel P Stephenson
(74) Attorney, Agent, or Firm—Robert Groover; Groover & Associates

(57) ABSTRACT

A system and method for detecting the wear of a roller bit bearing between a roller drill bit body and a roller bit rotatably attached to the roller drill bit body. A valve-plug is placed between the roller drill bit body and roller bit such that the valve-plug is removably fitted in a drilling fluid outlet in the roller drill bit body, and the valve-plug extends into a channel in the roller bit whereby uneven rotation or vibration of the roller bit causes the valve-plug to impact the sides of the channel which removes the valve-plug from the drilling fluid outlet to cause drilling fluid to flow through the drilling fluid outlet. The drop in pressure from the drilling fluid flowing through the drilling fluid outlet indicates that the roller bit is worn and may fail.

16 Claims, 3 Drawing Sheets

U.S. PATENT DOCUMENTS

| | | |
|---|---|---|
| 4,425,010 A | 1/1984 | Bryant et al. |
| 4,436,164 A | 3/1984 | Garner |
| 4,441,244 A | 4/1984 | Cason, Jr. |
| 4,493,042 A | 1/1985 | Shima et al. |
| 4,548,280 A | 10/1985 | Daly et al. |
| 4,562,559 A | 12/1985 | Sharp et al. |
| 4,610,313 A | 9/1986 | Daly et al. |
| 4,627,276 A | 12/1986 | Burgess et al. |
| 4,655,300 A * | 4/1987 | Davis et al. .................. 175/39 |
| 4,659,043 A | 4/1987 | Gallagher |
| 4,665,393 A | 5/1987 | Wilder et al. |
| 4,685,329 A | 8/1987 | Burgess |
| 4,688,647 A | 8/1987 | Daly et al. |
| 4,730,681 A * | 3/1988 | Estes .......................... 175/39 |
| 4,773,263 A | 9/1988 | Lesage et al. |
| 4,785,894 A * | 11/1988 | Davis et al. .................. 175/39 |
| 4,785,895 A * | 11/1988 | Davis et al. .................. 175/39 |
| 4,790,190 A | 12/1988 | Bambara et al. |
| 4,812,826 A | 3/1989 | Kaufman et al. |
| 4,818,153 A | 4/1989 | Strandell et al. |
| 4,852,399 A | 8/1989 | Falconer |
| 4,876,886 A | 10/1989 | Bible et al. |
| 4,903,245 A | 2/1990 | Close et al. |
| 4,911,252 A * | 3/1990 | Estes .......................... 175/39 |
| 4,926,686 A | 5/1990 | Fay |
| 4,926,950 A | 5/1990 | Zijsling |
| 4,928,521 A | 5/1990 | Jardine |
| 4,958,125 A | 9/1990 | Jardine et al. |
| 5,001,993 A | 3/1991 | Gramlow |
| 5,072,611 A | 12/1991 | Budd et al. |
| 5,138,875 A | 8/1992 | Booer |
| 5,140,311 A | 8/1992 | Cook |
| 5,141,061 A | 8/1992 | Henneuse |
| 5,159,577 A | 10/1992 | Twist |
| 5,183,123 A | 2/1993 | White |
| 5,216,917 A | 6/1993 | Detournay |
| 5,226,332 A | 7/1993 | Wassell |
| 5,249,871 A | 10/1993 | LaTorre et al. |
| 5,305,836 A | 4/1994 | Holbrook et al. |
| 5,321,981 A | 6/1994 | Macpherson |
| 5,372,207 A | 12/1994 | Naville et al. |
| 5,415,030 A | 5/1995 | Jogi et al. |
| 5,602,437 A | 2/1997 | Shahamat et al. |
| 5,633,628 A | 5/1997 | Denny et al. |
| 5,677,488 A | 10/1997 | Monahan |
| 5,691,707 A | 11/1997 | Smith et al. |
| 5,794,720 A | 8/1998 | Smith et al. |
| 5,864,058 A | 1/1999 | Chen |
| 5,865,543 A | 2/1999 | MacLean |
| 2001/0054514 A1 * | 12/2001 | Sullivan et al. ............... 175/40 |

* cited by examiner

ROLLER BIT REARING WEAR DETECTION SYSTEM AND METHOD

CROSS-REFERENCE TO RELATED APPLICATION

This application claims the benefit of U.S. Provisional Application Serial No. 60/226,764, filed Aug. 21, 2000.

BACKGROUND OF THE INVENTION

1. Field of the Invention

The present invention generally relates to subterranean drilling equipment. More particularly, the present invention relates to a system and method for detecting roller bit wear in a roller-cutter drill whereby the drilling operation can be ceased prior to roller drill bit failure.

2. Description of the Related Art

In rotary-cutter type subterranean drills, rotary drill bits are a commonly used type of drill bit, especially in the oil and gas well drilling industry, because the rotary drill bit offers a satisfactory rate of penetration with a significant operational life in drilling most commonly encountered formations. Roller cutter drill bits include a bit body having a threaded pin at its upper end adapted to be detachably secured to a drill string suspended from a drill rig, and a plurality of depending legs, typically three such legs, at the lower end of the body. The drill bit further includes a plurality of conical roller-cutters having cutting elements thereon, with one roller-cutter on each leg, and each leg typically includes a bearing for rotatably mounting each roller-cutter thereon.

Sealed bearing type roller-cutter bits further have a lubrication system including a reservoir holding a supply of lubricant. A passage in the bit body extends from the reservoir to the bearing to allow flow of lubricant to the bearing. A seal is disposed between the roller cutter and the bearing journal that holds lubricant in the bit. A diaphragm at the reservoir provides pressure compensation between the lubricant and the drilling fluid in the annulus between the bit and the well bore.

In use, roller cutter drill bits are rotated in the well bore on the end of a drill string that applies a relatively high downward force onto the drill bit. As the bits are rotated, the conical roller cutters rotate on the bearing journals thereby bringing the cutting elements on the roller cutters into engagement with the substrate at the bottom of the well bore. The cutting elements drill through the substrate at the well bore bottom by applying high point loads to the substrate to thereby cause the substrate to crack or fracture from the compression. A drilling fluid, commonly called drilling mud, passes under pressure from the surface through the drill string to the drill bit, and is ejected from one or more nozzles adjacent the roller-cutters and the drilling fluid is then forced back up the well bore to the surface.

For cost-effective drilling, a worn drill bit needs to be replaced due to the reduced rate of drilling penetration for the worn bit. At a certain point, the cost of replacing the old drilling bit with a new bit becomes equal to the cost of the drilling inefficiency, or in other words, the cost of the new bit plus the cost of rig time in tripping the drill string in and out of the well bore is less then cost of operating the worn bit. Unfortunately, once a drill bit is positioned in a well bore, gathering reliable information regarding the operating condition, performance and remaining useful life of the drill bit becomes difficult. Typically, the decision by a drilling rig operator to replace a drill bit is a subjective one, based upon experience and general empirical data showing the performance of similar drill bits in drilling similar substrate formations. However, the rig operator's decision as to when to replace a drill bit is often not the most cost effective because of the many factors affecting drilling performance beyond the condition and performance of the bit itself In the worst case, the drilling rig operator may unknowingly run the drill bit until failure. Bit failure may also result from an improper application of the bit, such as by excessive weight on the drill bit from the drilling string, excessive rotational speed, and drilling with the wrong type of bit for substrate being drilled, or even from a defect in the drill bit itself. Bit failures typically occur in one of two modes: (1) breakage of the cutting elements, or (2) bearing failure. The first mode of failure is more common, and the second mode is more serious.

In the first mode, pieces of the cutting elements, which are typically either steel teeth or tungsten carbide inserts, are broken from the roller cutters. This breakage does not normally stop the drilling action but it does significantly reduces the rate of drilling penetration, and the broken pieces are mostly carried away from the well bore bottom by the circulating drilling fluid thereby leaving the well bore bottom clean for a replacement bit.

The second mode of failure can occur if the bit is continued to be used with a failed bearing assembly as the assembly will no longer be able to hold the roller cutter on the bearing journal, and consequently, the roller cutter will fall from the bit when the drill string is pulled from the well bore. A lost roller cutter can be retrieved from the well bore bottom only by a time-consuming and expensive "fishing" operation in which a special retrieval tool is tipped in and out of the well bore to retrieve the broken cutter and any pieces.

In sealed bearing roller cutter bits, bearing failure is often the result of a seal failure that causes lubricant to flow out of the drill bit and drilling fluid, which contains abrasive particles, to flow into the bearing. Although less common, diaphragm failure has the same result as seal failure. In any event, bearing failure is almost always preceded by, or at least accompanied by, a loss of lubricant.

Numerous bearing failure indicator systems have been proposed for inclusion in drill bits so as to give the drilling rig operator a signal predicting bearing failure. One such system involves measurement and interpretation of certain drilling parameters at the drill rig, such as drill string torque, weight on bit, and rate of penetration, to predict drill bit bearing failure. In practice this system has proved to be unreliable, which is likely due to the large number of variables other than bit performance, such as the type of formation and the pressure and flow rate of the drilling fluid, which affect the drilling parameters measured at the drill rig.

Another system, involves a marker fluid, such as a radioactive material in the bearing lubricant, which is released into the drilling fluid upon bearing failure. The released marker fluid is detected at the drill rig when the drilling fluid is circulated back up to the surface. While this method does detect the loss of lubricant in a sealed bearing drill bit that precedes, or at least accompanies, the failure of the bearings of the bit, and thus is a reliable indication of bit failure, the system has several shortcomings. In addition to the difficulties present in handling radioactive materials, a significant amount of marker fluid must be released into the relatively large volume of drilling fluid or else become so diluted as to be undetectable.

Therefore, it would be advantageous to provide a system and method to reliably detect the wear of a roller bit prior to catastrophic failure of the roller bit with the roller bit, the roller cutters or pieces thereof requiring extrication from the well bore. Such method should be simple in implementation and not require separate elaborate equipment to be used at the drill rig or on the drill bit. It is to the provision of such an improved method for detecting roller bit bearing wear that the present invention is primarily directed.

SUMMARY OF THE INVENTION

The present invention is a system and method for detecting the wear of a roller bit bearing on a roller drill bit body. In the system, the roller drill bit body has at least one bearing and a drilling fluid outlet that selectively has drilling fluid flow through it. A roller bit is rotatably attached to the roller drill bit body at the bearing and adjacent the drilling fluid outlet, and the roller bit includes a channel therein. A valve-plug is positioned between the drilling fluid outlet of the roller drill bit body and the channel of the roller bit, and the valve-plug selectively opens the drilling fluid outlet when significant wear of the roller bit is detected.

In one embodiment, the drilling fluid outlet includes a seat, and the valve-plug includes a head and a shaft. The valve-plug head is removably seated in the seat of the drilling fluid outlet of the roller drill bit body and the valve-plug shaft extends into the channel of the roller bit, and thus, uneven rotation or vibration of the roller bit causes the valve-plug shaft to impact the sides of the channel and to unseat the valve-plug head from the drilling fluid outlet thereby causing drilling fluid to flow through the drilling fluid outlet.

The valve-plug can be embodied in any shape, such as with a head and shaft, as a single elongate body, as a generally frustoconical body, or in any other shape as would be suitable to function as a valve-plug as described herein. Moreover, the valve-plug can be comprised of a single uniform solid material, or can be comprised of several different types of materials having different hardness and tensile strength. For example, when the valve-plug is embodied as having a head and shaft, the valve-plug head can be comprised of a different material than the valve-plug shaft, and can include at least a rim comprised of a brittle material.

If the valve-plug is embodied as having a head of a softer material than the valve-plug shaft, uneven rotation or vibration of the roller bit causes the valve-plug shaft to impact the sides of the channel which causes the valve-plug head to deform and unseat from the drilling fluid outlet thereby causing drilling fluid to flow through the drilling fluid outlet indicating a worn roller bit. If the valve-plug is embodied as having a rim of brittle material, uneven rotation or vibration of the roller bit causes the valve-plug shaft to impact the sides of the channel which causes the rim of the valve-plug head to fracture and unseat from the drilling fluid outlet thereby causing drilling fluid to flow through the drilling fluid outlet.

The present invention further provides a method for detecting the wear of a roller bit bearing on a roller drill bit body having at least one bearing and a drilling fluid outlet selectively having drilling fluid flow therethrough, with a roller bit rotatably attached to the roller drill bit body at the bearing and adjacent the drilling fluid outlet, and the roller bit includes a channel therein. The method includes the steps of placing a valve-plug between the roller drill body and roller drill bit such that the valve-plug is removably fitted in the drilling fluid outlet of the roller drill bit body and extending into the channel of the roller bit, rotating the roller bit, removing the valve-plug from the drilling fluid outlet through the valve-plug impacting the sides of the channel, thereby causing drilling fluid to flow through the drilling fluid outlet, and detecting the drop in drilling fluid pressure attributable to drilling fluid flowing through the drilling fluid outlet due to the removal of the valve-plug.

Preferably, the drilling fluid outlet includes a seat, and the valve-plug includes a head and shaft such that the step of placing a valve-plug between the roller drill body and roller drill bit is placing a valve-plug between the roller drill body and roller drill bit such that the valve-plug head is removably seated in the seat of the drilling fluid outlet of the roller drill bit body and the valve-plug shaft extends into the channel of the roller bit, wherein uneven rotation of the roller bit causes the valve-plug shaft to impact the sides of the channel and to unseat the valve-plug head from the drilling fluid outlet. The step of rotating the roller bit is preferably rotating the roller bit wherein the sides of channel do not significantly impact the valve-plug shaft during even rotation of the roller bit, and the step of unseating the valve-plug head is unseating the valve-plug head wherein uneven rotation of the roller bit causes the through the valve-plug shaft impacting the sides of the channel; the impact with the channel sides is sufficient to unseat the valve-plug head from the drilling fluid outlet to thereby cause drilling fluid to flow through the drilling fluid outlet.

If the valve-plug head is comprised of a different material than the valve-plug shaft, the step of unseating the valve-plug head is unseating the valve-plug head through the valve-plug shaft impacting the sides of the channel which causes the valve-plug head to deform and unseat from the drilling fluid outlet thereby causing drilling fluid to flow through the drilling fluid outlet. If the valve-plug head includes at least a rim comprised of a brittle material, the step of unseating the valve-plug head is unseating the valve-plug through the valve-plug shaft impacting the sides of the channel which causes the rim of the valve-plug head to fracture and unseat from the drilling fluid outlet thereby causing drilling fluid to flow through the drilling fluid outlet.

The present invention therefore provides a simple and inexpensive system and method to detect roller bit wear during the drilling operation using a drop in the drilling fluid pressure as an indication of the condition of the roller bit. Upon uneven rotation or vibration in the roller drill bit occurring from wear of the roller bit bearing, the valve-plug is removed from the drilling fluid outlet, which allows drilling fluid to flow through the outlet, in addition to other outlets where drilling fluid normally flows during operation of the roller drill bit. The several embodiments of the valve-plug can be removed from the drilling fluid outlet through many methods, such as simple dislodging or unseating, deformation within the drilling fluid outlet, or fracture of the valve-plug if it is made from or includes a component of a brittle material.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
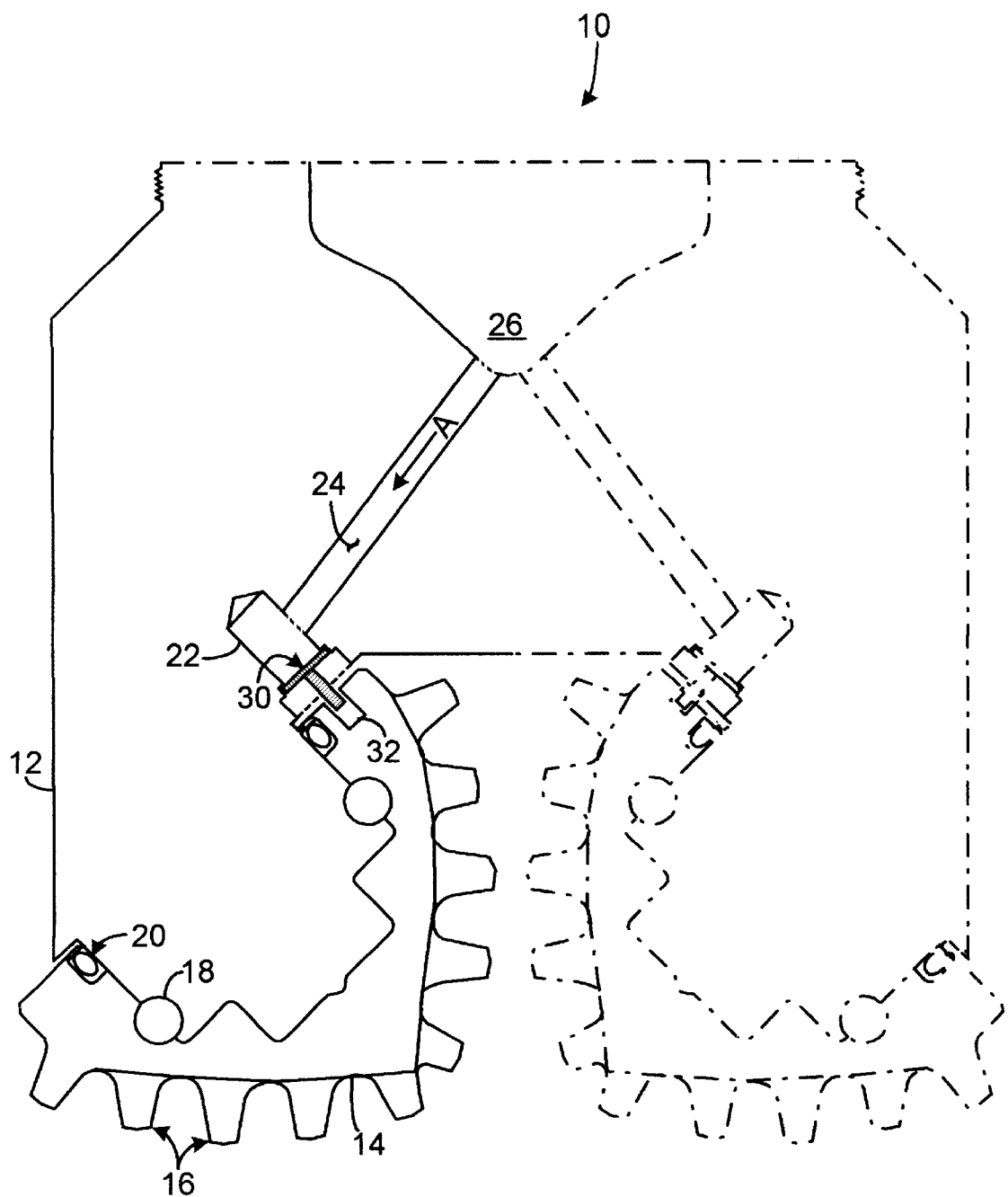
FIG. 1 is a cross-section of a roller-cutter drill bit with a single roller drill bit having the lower end of a valve-plug fitted within a channel on the roller bit.

With reference to the figures in which like numerals represent like elements throughout, FIG. 1 is a system for detecting the wear of a roller bit bearing where a roller drill, or roller cutter assembly 10, includes a roller drill bit body 12 and at least one roller bit 14 rotatably attached thereto. The roller bit 14 includes plurality of cutting elements 16 that are rotated and provide a compressing action to the substrate to drill thereinto. The roller bit 14 is attached to the drill bit body 12 at a bearing 18, and a lubricant passage 20 provides lubrication to the rotation of the roller drill bit 14 rotating about bearing 18. The general construction and operation of a roller-cutter cutter drill is well known, and the present invention can be implemented in any roller-cutter construction, as would be apparent to one of skill in the art.

The drilling body 12 has a drilling fluid outlet 22, which is connected via a drilling fluid passage 24 to a central drilling fluid passage 26, and if the drilling fluid outlet 22 is open, drilling fluid will flow through the drilling fluid passage 24 in the direction of arrow A. The drilling fluid, often referred to a drilling mud, is used in drilling to move loosened substrate away from the drilling bit 16 and back towards the surface. Consequently, there will be one or more main outlets (not shown) for the drilling fluid that cause the drilling fluid to flow through the drill string, drill bit body, and back up the well bore. The drilling fluid will thus have a constant or mostly constant rate of flow and pressure during the normal operation of the roller drill bit 14.

In the roller drill bit 30, there is a channel 32 in between the roller bit 14 and drill body 12 that extends around the periphery of the roller bit 14. The channel 32 rotates around a stationary point during rotation of the roller bit 14 such that during even, harmonious rotation, an object can be placed into the channel 32 and not significant impact the sidewalls thereof. Thus, a valve-plug 30 is affixed within the drilling fluid outlet 22 and extends within the channel 32 to implement the present inventive system and method to detect roller bit 14 bearing 18 wear.

Figure 2A:
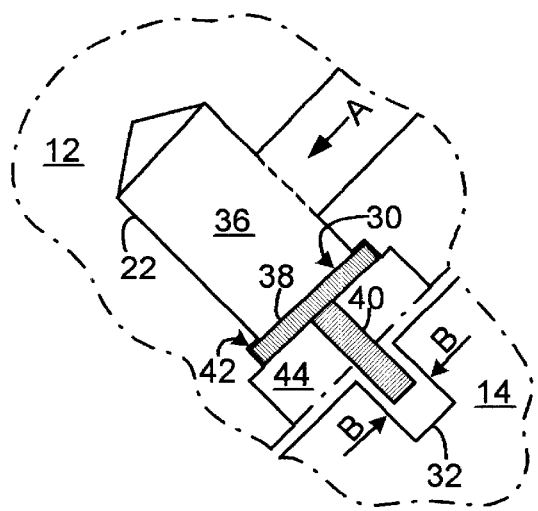
FIG. 2A is a cross-section of the valve-plug with the valve-plug head seated in the drilling fluid outlet and the valve-plug shaft extending into a channel on the roller bit.
Figure 2B:
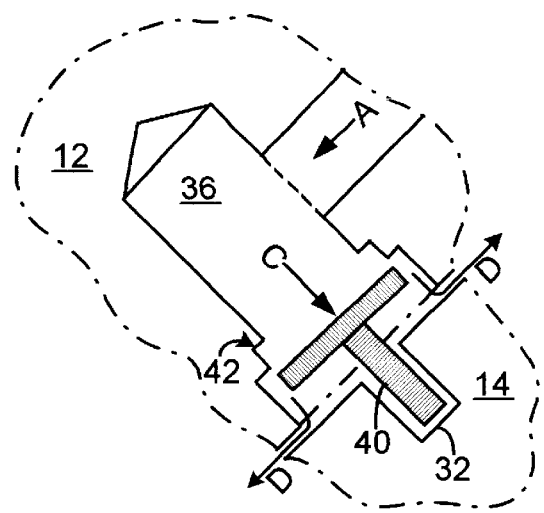
FIG. 2B is a cross-section of the valve-plug with the valve-plug head unseated from the drilling fluid outlet and drilling fluid flowing around the valve-plug and out into the well bore.

As shown in FIGS. 2A and 2B, the valve-plug 30 fits into the drilling fluid outlet 22 whereby drilling fluid is prevented from passing through the outlet 22 by the presence of the valve-plug 30. As here embodied, the drilling fluid outlet 22 has a inner chamber 36 where the drilling fluid pools, and an outer passage 44, which is open to the gap between the roller drill bit body 12 and roller drill bit 14, and a seat 42 is between the inner chamber 36 and outer chamber 44. In the embodiment of the valve-plug 30 shown in FIGS. 2A and 2B, the valve-plug 30 includes a head 38 and shaft 40, and the valve-plug head 38 is removably seated in the seat 42 of the drilling fluid outlet 22 of the roller drill bit body 12, and the valve-plug shaft 40 extends into the channel 32 of the roller bit 14. Uneven rotation or vibration of the roller bit 14, shown as force applied in arrows B, will cause the valve-plug shaft 40 to impact the sides of the channel 32 and to unseat the valve-plug head 38 from the seat 42 of the drilling fluid outlet 22 thereby causing drilling fluid to flow through the drilling fluid outlet 22. During regular operation of the roller bit 14, the valve-plug shaft 40 can mildly impact the sidewalls of the channel 32 without dislodging or unseating the valve-plug 30. However, the system should particularly detect if one or more cutting elements 16 of the roller bit 14 are lost, so the valve-plug 30 should become dislodged from the common vibration that occurs in a particular roller bit 14 from the uneven rotation of the roller bit 14 missing one or more cutting elements 16.

Once the valve-plug 30 is dislodged, as shown in FIG. 2B, the drilling fluid pressure pushes against the unseated valve-plug head 38, as shown by Arrow C, and thus the drilling fluid will flow around the valve-plug head 38 and out from the gap between the roller drill bit body 12 and roller drill bit 14, as shown by Arrows D. The valve-plug shaft 40 can be held within the channel 32, or can be partially or completely broken off from the valve-plug 30, so long as once the valve-plug head 38 was dislodged, it remains dislodged so that the drilling fluid can flow from the inner chamber 36 through the outer chamber 44 and out into the well bore.

Accordingly, once the valve-plug head 38 is dislodged from the drilling fluid outlet 22, the drilling fluid will flow from the drilling fluid outlet 22, the additional flow lowering the overall drilling fluid pressure because of the additional outlet passing of the drilling fluid. The operator of the drilling rig can detect the drop in pressure of the drilling fluid to indicate an imminent roller bit 14 failure and the operator can cease the drilling operation. The specific numerical change in the drilling pressure (p.s.i) from the additional opening of the drilling fluid outlet 22 can be predetermined in the construction of the present system.

Figure 3:
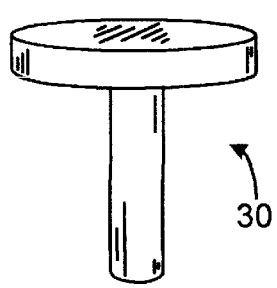
FIG. 3 is a perspective view of the valve-plug.
Figure 4:
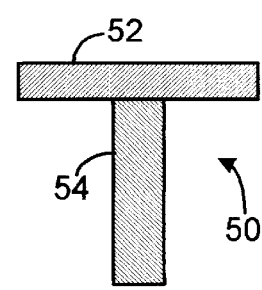
FIG. 4 is a cross section of an embodiment of the valve-plug wherein the valve-plug has a head comprised of a different material than the valve-plug shaft.

There are several possible embodiments of the valve-plug 30. The valve-plug 30, as shown in FIGS. 1–3, is generally cylindrical through both head 38 and shaft 40, as is illustrated in the perspective view of the valve-plug 30 shown in FIG. 3. In such embodiment, the valve-plug 30 components can be made from several materials. In FIG. 4, there is shown a cross-section of an embodiment of the valve-plug 50 wherein the head 52 is made of a first material softer than the material comprising the shaft 54. Thus, in operation, the more rigid valve-plug shaft 54 will cause the valve-plug head 52 will deform to become unseated or dislodged from the drilling fluid outlet 22 to allow the drilling fluid to flow.

Figure 5:
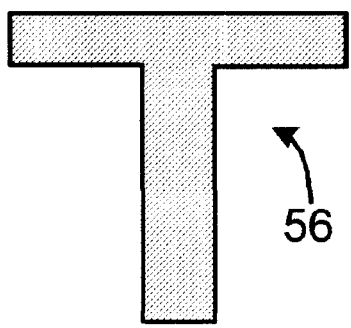
FIG. 5 is a cross section an embodiment of the valve-plug wherein the entire valve-plug is comprised of the same material.

In an alternate embodiment shown in FIG. 5, the valve-plug 56 is comprised of one 30 material, and accordingly, the valve-plug 56 simply dislodges from the seat 42 of the drilling fluid outlet 22. In a further embodiment shown in FIG. 6, the valve-plug 58 includes a head 60 comprised of one material, a shaft 62 comprised of another material, and the valve-plug head 60 includes at least a rim 64 comprised of a brittle material, such as cast iron or other low-tensile strength material. Thus, in the embodiment of valve-plug 58, the brittle rim 64 fractures upon the shaft 62 impacting the sidewalls of the channel 32, which then allows drilling fluid to flow through the drilling fluid outlet 22.

Figure 7:
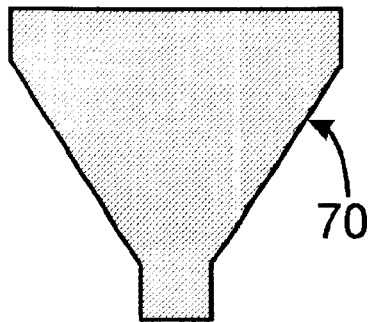
FIG. 7 is an alternate embodiment of the valve-plug having a generally frustoconical shape.
Figure 8:
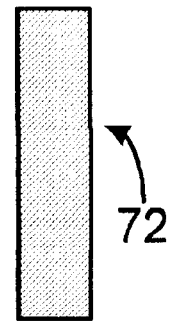
FIG. 8 is an alternate embodiment of the valve-plug comprised of a single, generally cylindrical body.

Other embodiments of the valve-plug are possible in the present invention, such as the valve-plug 70 illustrated in FIG. 7 wherein the valve-plug 70 is a single piece, generally frustoconical body that functions in the same manner as the valve-plug 30 shown in FIGS. 1–3. Alternately, the valve-plug 72 can be a single generally elongate piece, as shown in FIG. 8, wherein the valve-plug 72 simply fits into the entire drilling fluid outlet 22 and is dislodged therefrom with uneven rotation of the roller drill bit 14. The valve-plug 72 can be of a generally elongate, cylindrical shape, or can have any geometric cross-sectional profile.

The present inventive valve-plug 30 can be used in all of the roller drill bits of a roller-cutter drill bit, with the failure of any one valve-plug 30 indicating a possible impending roller bit failure. Furthermore, the level of force from the uneven rotation or the vibration necessary to dislodge or unseat the valve-plug 30 can be arbitrary to suit the particular design of the roller drill bit or substrate formation. Additionally, the pressure of the drilling fluid on the valve-plug 30, shown by Arrow C in FIG. 2B, can be increased by the drill operator to decrease the force required to be exerted on the valve-plug shaft 30 to remove, unseat, or dislodge the valve-plug 30 from the drilling fluid outlet 22.

As shown in FIGS. 1–2A, the present invention accordingly provides a method for detecting the wear of a roller bit bearing 18 on a roller drill bit body 12 having at least one bearing 18 and a drilling fluid outlet 22 selectively having drilling fluid flow therethrough, and a roller bit 14 rotatably attached to the roller drill bit body 12 at the bearing 18 and adjacent the drilling fluid outlet 22, wherein the roller bit 14 includes a channel 32 therein, the method comprising the steps of placing a valve-plug between the roller drill body 12 and roller drill bit 14 such that the valve-plug 30 is removably fitted in the drilling fluid outlet 22 of the roller drill bit body 12 and extending into the channel 32 of the roller bit 14, rotating the roller bit 14, removing the valve-plug 30 from the drilling fluid outlet 22 through the valve-plug 30 impacting the sides of the channel 32, thereby causing drilling fluid to flow through the drilling fluid outlet, 22 and detecting the drop in drilling fluid pressure attributable to drilling fluid flowing through the drilling fluid outlet 22 due to the removal of the valve-plug 30.

If the drilling fluid outlet 22 includes a seat 42, and the valve-plug 30 includes a head 38 and shaft 40, the step of placing a valve-plug 30 between the roller drill body 12 and roller drill bit 14 is placing a valve-plug 30 between the roller drill body 12 and roller drill bit 14 such that the valve-plug head 38 is removably seated in the seat 42 of the drilling fluid outlet 22 of the roller drill bit body 12 and the valve-plug shaft 40 extends into the channel 32 of the roller bit 14, wherein uneven rotation of the roller bit 14 causes the valve-plug shaft 40 to impact the sides of the channel 32 and to unseat the valve-plug head 38 from the drilling fluid outlet 22.

The step of rotating the roller bit 14 is preferably rotating the roller bit 14 wherein the sides of channel 32 do not significantly impact the valve-plug shaft 40 during even rotation of the roller bit 14, and the step of unseating the valve-plug head 38 is unseating the valve-plug head 38 wherein uneven rotation of the roller bit 14 causes the through the valve-plug shaft 40 impacting the sides of the channel 32, the impact sufficient to unseat the valve-plug head 38 from the drilling fluid outlet 22 to thereby cause drilling fluid to flow through the drilling fluid outlet 22.

Figure 6:
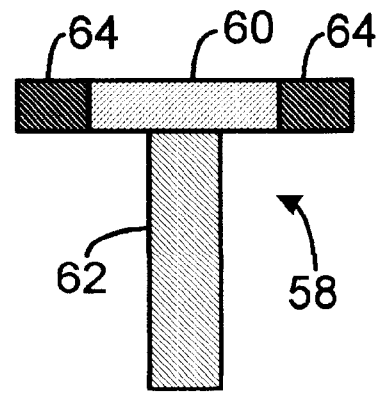
FIG. 6 is a cross section of an embodiment of the valve-plug wherein the valve-plug head has a rim comprised of a brittle or soft material, and the rim is a different material from the remaining portion of the valve-plug head and/or the valve-plug shaft.

If the valve-plug head 38 is comprised of a different material than the valve-plug shaft 40, such as in FIG. 4, the step of unseating the valve-plug head 38 is unseating the valve-plug head 38 through the valve-plug shaft 40 impacting the sides of the channel 32 which causes the valve-plug head 38 to deform and unseat from the drilling fluid outlet 22 thereby causing drilling fluid to flow through the drilling fluid outlet 22. And if, as shown in FIG. 6, the valve-plug head 60 includes a rim 64 comprised of a brittle material, the step of unseating the valve-plug head 60 is unseating the valve-plug head 60 through the valve-plug shaft 62 impacting the sides of the channel 32 which causes the rim 64 of the valve-plug head 60 to fracture and unseat from the drilling fluid outlet 22 thereby causing drilling fluid to flow through the drilling fluid outlet 22.

While there has been shown a preferred and alternate embodiments of the present invention, it is to be understood that certain changes may be made in the forms and arrangement of the elements and steps of the method without departing from the underlying spirit and scope of the invention as is set forth in the claims.

What is claimed is:

1. A system for detecting the wear of a roller bit bearing, comprising:
   a roller drill bit body having at least one bearing and a drilling fluid outlet selectively having drilling fluid flow therethrough;
   a roller bit rotatably attached to the roller drill bit body at the bearing and adjacent the drilling fluid outlet, wherein the roller bit includes a channel therein; and
   a valve-plug removably fitted in the drilling fluid outlet of the roller drill bit body and extending into the channel of the roller bit, wherein uneven rotation of the roller bit causes the valve-plug to impact the sides of the channel and removal of the valve-plug from the drilling fluid outlet thereby causing drilling fluid to flow through the drilling fluid outlet.

2. The system of claim 1, wherein:
   the drilling fluid outlet includes a seat; and
   the valve-plug includes a head and a shaft, and wherein the valve-plug head is removably seated in the seat of the drilling fluid outlet of the roller drill bit body and the valve-plug shaft extends into the channel of the roller bit, wherein uneven rotation of the roller bit causes the valve-plug shaft to impact the sides of the channel and to unseat the valve-plug head from the drilling fluid outlet.

3. The system of claim 2, wherein the valve-plug head and the valve-plug shaft are comprised of the same material.

4. The system of claim 2, wherein the valve-plug head is comprised of a different material than the valve-plug shaft.

5. The system of claim 4, wherein uneven rotation of the roller bit causes the valve-plug shaft to impact the sides of the channel which causes the valve-plug head to deform and unseat from the drilling fluid outlet thereby causing drilling fluid to flow through the drilling fluid outlet.

6. The system of claim 2, wherein the valve-plug head includes at least a rim comprised of a brittle material.

7. The system of claim 6, wherein uneven rotation of the roller bit causes the valve-plug shaft to impact the sides of the channel which causes the rim of the valve-plug head to fracture and unseat from the drilling fluid outlet thereby causing drilling fluid to flow through the drilling fluid outlet.

8. A method for detecting the wear of a roller bit bearing on a roller drill bit body having at least one bearing and a drilling fluid outlet selectively having drilling fluid flow therethrough, and a roller bit rotatably attached to the roller drill bit body at the bearing and adjacent the drilling fluid outlet, wherein the roller bit includes a channel therein, the method comprising the steps of:

placing a valve-plug between the roller drill body and roller drill bit such that the valve-plug is removably fitted in the drilling fluid outlet of the roller drill bit body and extending into the channel of the roller bit;

rotating the roller bit;

removing the valve-plug from the drilling fluid outlet through the valve-plug impacting the sides of the channel, thereby causing drilling fluid to flow through the drilling fluid outlet; and detecting the drop in drilling fluid pressure attributable to drilling fluid flowing through the drilling fluid outlet due to the removing of the valve-plug.

9. The method of claim 8, wherein:

the drilling fluid outlet includes a seat, and the valve-plug includes a head and shaft; and the step of placing a valve-plug between the roller drill body and roller drill bit is placing a valve-plug between the roller drill body and roller drill bit such that the valve-plug head is removably seated in the seat of the drilling fluid outlet of the roller drill bit body and the valve-plug shaft extends into the channel of the roller bit, wherein uneven rotation of the roller bit causes the valve-plug shaft to impact the sides of the channel and to unseat the valve-plug head from the drilling fluid outlet.

10. The method of claim 9, wherein:

the step of rotating the roller bit is rotating the roller bit wherein the sides of channel do not significantly impact the valve-plug shaft during even rotation of the roller bit; and the step of unseating the valve-plug head is unseating the valve-plug head wherein uneven rotation of the roller bit causes the through the valve-plug shaft impacting the sides of the channel, the impact sufficient to unseat the valve-plug head from the drilling fluid outlet to thereby cause drilling fluid to flow through the drilling fluid outlet.

11. The method of claim 9, wherein the valve-plug head is comprised of a different material than the valve-plug shaft, and wherein the step of unseating the valve-plug head is unseating the valve-plug head through the valve-plug shaft impacting the sides of the channel which causes the valve-plug head to deform and unseat from the drilling fluid outlet thereby causing drilling fluid to flow through the drilling fluid outlet.

12. The method of claim 9, wherein the valve-plug head includes at least a rim comprised of a brittle material and wherein the step of unseating the valve-plug head is unseating the valve-plug head through the valve-plug shaft impacting the sides of the channel which causes the rim of the valve-plug head to fracture and unseat from the drilling fluid outlet thereby causing drilling fluid to flow through the drilling fluid outlet.

13. A system for detecting the wear of a roller bit bearing, comprising:

a roller drill bit body having at least one bearing and a drilling fluid outlet, and the drilling fluid outlet selectively having drilling fluid flow therethrough;

a roller bit rotatably attached to the roller drill bit body at the bearing and adjacent the drilling fluid outlet, wherein the roller bit includes a channel therein; and a valve-plug means for detecting the wear of the roller bit, the valve-plug means positioned between the drilling fluid outlet of the roller drill bit body and the channel of the roller bit, wherein the valve-plug means selectively opens the drilling fluid outlet.

14. The system of claim 13, wherein:

the drilling fluid outlet includes a seat; and the valve-plug means is a valve-plug having a head and a shaft, the valve-plug head removably seated in the seat of the drilling fluid outlet of the roller drill bit body and the valve-plug shaft extending into the channel of the roller bit, wherein uneven rotation of the roller bit causes the valve-plug shaft to impact the sides of the channel and to unseat the valve-plug head from the drilling fluid outlet.

15. The system of claim 13, wherein the valve-plug means is a single elongate body.

16. The system of claim 13, wherein the valve-plug means is a generally frustoconical body.

* * * * *

UNITED STATES PATENT AND TRADEMARK OFFICE
CERTIFICATE OF CORRECTION

PATENT NO. : 6,631,772 B2
DATED : October 14, 2003
INVENTOR(S) : Palaschenko

It is certified that error appears in the above-identified patent and that said Letters Patent is hereby corrected as shown below:

Title page,
Item [54], Title reads, "ROLLER BIT REARING WEAR DETECTION SYSTEM AND METHOD" please correct to -- ROLLER BIT BEARING WEAR DETECTION SYSTEM AND METHOD --

Signed and Sealed this

Twenty-fifth Day of May, 2004

JON W. DUDAS
*Acting Director of the United States Patent and Trademark Office*